US011920226B2

(12) United States Patent
Yamamoto et al.

(10) Patent No.: US 11,920,226 B2
(45) Date of Patent: Mar. 5, 2024

(54) POWDER FOR MAGNETIC MEMBER

(71) Applicant: Sanyo Special Steel Co., Ltd., Himeji (JP)

(72) Inventors: Takahisa Yamamoto, Himeji (JP); Koudai Miura, Himeji (JP); Toshiyuki Sawada, Himeji (JP)

(73) Assignee: Sanyo Special Steel Co., Ltd., Himeji (JP)

( * ) Notice: Subject to any disclaimer, the term of this patent is extended or adjusted under 35 U.S.C. 154(b) by 378 days.

(21) Appl. No.: 17/279,122

(22) PCT Filed: Sep. 18, 2019

(86) PCT No.: PCT/JP2019/036505
§ 371 (c)(1),
(2) Date: Mar. 24, 2021

(87) PCT Pub. No.: WO2020/066779
PCT Pub. Date: Apr. 2, 2020

(65) Prior Publication Data

US 2021/0398719 A1 Dec. 23, 2021

(30) Foreign Application Priority Data

Sep. 25, 2018 (JP) ................................ 2018-179174

(51) Int. Cl.
*C22C 45/00* (2023.01)
*B22F 1/00* (2022.01)
(Continued)

(52) U.S. Cl.
CPC .............. *C22C 45/008* (2013.01); *B22F 1/00* (2013.01); *B22F 1/065* (2022.01); *B22F 1/102* (2022.01);
(Continued)

(58) Field of Classification Search
CPC ....... C22C 38/32; C22C 38/54; C22C 45/008; C22C 45/02; B22F 1/065; B22F 1/10;
(Continued)

(56) References Cited

U.S. PATENT DOCUMENTS 4,036,638 A 7/1977 Ray et al.
2012/0286191 A1* 11/2012 Maeda .................... H01F 1/061 252/62.55

FOREIGN PATENT DOCUMENTS

CN 105474334 A 4/2016
JP S525620 A 1/1977
(Continued)

*Primary Examiner* — Ricardo D Morales
(74) *Attorney, Agent, or Firm* — The Webb Law Firm

(57) ABSTRACT

Provided is a powder suitable for a magnetic member capable of suppressing noise in a frequency range of 100 kHz to 20 MHz. The powder for a magnetic member contains a plurality of particles 2. The main part of the particle 2 is made of an alloy. The alloy contains B. The content of B in the alloy is 5.0 mass % or more and 8.0 mass % or less. The alloy may further contain one or more elements selected from the group consisting of Cr, Mn, Co, and Ni. The content of these elements is 0 mass % or more and 25 mass % or less. The balance of the alloy is Fe and unavoidable impurities. The alloy contains an $Fe_2B$ phase. The area percentage of the $Fe_2B$ phase in the alloy is 20 mass % or more and 80 mass % or less.

12 Claims, 1 Drawing Sheet

6

(51) Int. Cl.
*B22F 1/065* (2022.01)
*B22F 1/102* (2022.01)
*B22F 1/145* (2022.01)
*B22F 1/16* (2022.01)
*H01F 1/147* (2006.01)

(52) U.S. Cl.
CPC ................ *B22F 1/16* (2022.01); *H01F 1/147* (2013.01); *B22F 1/145* (2022.01)

(58) Field of Classification Search
CPC .. B22F 1/102; B22F 1/14; B22F 1/145; B22F 1/16; H01F 1/147–15391
See application file for complete search history.

(56) References Cited

FOREIGN PATENT DOCUMENTS

| | | | | | |
|---|---|---|---|---|---|
| JP | 200784858 | A | | 4/2007 | |
| JP | 2007084858 | A | * | 4/2007 | |
| JP | 20097534 | A | | 1/2009 | |
| JP | 2011108775 | A | | 6/2011 | |
| JP | 2017208416 | A | | 11/2017 | |
| KR | 1020100138657 | A | * | 12/2010 | .............. B22F 1/105 |
| WO | WO-9967866 | A1 | * | 12/1999 | ............. H01C 10/10 |

* cited by examiner

POWDER FOR MAGNETIC MEMBER

CROSS-REFERENCE TO RELATED APPLICATIONS

This application is the United States national phase of International Application No. PCT/JP2019/036505 filed Sep. 18, 2019, and claims priority to Japanese Patent Application No. 2018-179174 filed Sep. 25, 2018, the disclosures of which are hereby incorporated by reference in their entirety.

BACKGROUND OF THE INVENTION

Field of the Invention

The present invention relates to a powder for a magnetic member. In detail, the present invention relates to a powder dispersed in a member such as a magnetic sheet or a magnetic ring.

Description of Related Art

Portable electronic devices such as a portable phone, a notebook-size personal computer, and a tablet personal computer have become prevalent in recent years. Most recently, these devices have advanced in size reduction and performance improvement. With the size reduction of the device, the size reduction and performance improvement of circuit components in the device are increasingly required. In the device achieving size reduction and performance improvement, the density of electronic parts attached to a circuit is high. Therefore, radio wave noise emitted from the electronic parts is apt to cause radio wave interference between the electronic parts, and radio wave interference between electronic circuits. The radio wave interference causes malfunction of the electronic devices.

A noise suppressing sheet may be inserted into the electronic device for the purpose of suppressing the radio wave interference. The noise suppressing sheet converts emitted radiation radio wave (noise) into magnetism, to prevent the emission of radio wave out of an electronic circuit. The noise suppressing sheet is easily processed, and has high flexibility in shape.

An oxide referred to as ferrite is used as a magnetic material for a typical conventional noise suppressing sheet. The ferrite has small permeability in a high frequency region. Specifically, the ferrite has small permeability in a frequency range of 100 kHz to 20 MHz. Therefore, the efficiency of conversion to magnetism from radio wave in the frequency region is insufficient.

A magnetic sheet and a magnetic ring are proposed, which contain no ferrite and contain a soft magnetic metal powder having high permeability. A noise suppressing sheet containing an FeMn alloy powder is disclosed in Patent Document 1 (JP2017-208416A). A noise suppressing sheet containing an Fe—Si—Al-based flaky powder is disclosed in Patent Document 2 (JP2011-108775A).

CITATION LIST

Patent Literature

Patent Document 1: JP2017-208416A
Patent Document 2: JP2011-108775A

SUMMARY OF INVENTION

In the powder disclosed in Patent Document 1, particles are flattened for the purpose of reducing a demagnetizing factor. An alloy of the particles is not suitable for use in a spherical shape. Furthermore, the particles are not suitable for use in mixture with a resin.

In the noise suppressing sheet described in Patent Document 2, the powder is flattened, whereby high permeability can be achieved also in a relatively high frequency region. However, the powder having an Fe—Si—Al-based composition does not sufficiently suppress noise in a high frequency range close to 20 MHz.

Noise suppression in a high frequency range is required for a magnetic member used for recent electronic devices. An object of the present invention is to provide a powder suitable for a magnetic member capable of suppressing noise in a frequency range of 100 kHz to 20 MHz.

A powder for a magnetic member according to the present invention is composed of a plurality of particles. A main part of each of the particles is made of an alloy composed of 5.0 mass % or more and 8.0 mass % or less of B, with the balance being Fe and unavoidable impurities. The alloy contains an $Fe_2B$ phase.

According to another aspect, a powder for a magnetic member according to the present invention is composed of a plurality of particles. A main part of each of the particles is made of an alloy composed of 5.0 mass % or more and 8.0 mass % or less of B, and 0 mass % or more and 25 mass % or less of one or more selected from the group consisting of Cr, Mn, Co, and Ni, the balance being Fe and unavoidable impurities. The alloy contains an $Fe_2B$ phase.

Preferably, an area percentage PS of the $Fe_2B$ phase in the alloy is 20% or more and 80% or less.

Preferably, a ratio of bHc to weighted average N of the number of electrons possessed by each element (bHc/N) in the alloy is 500 A/(m·electron) or more and 700 A/(m·electron) or less.

The particles may include an insulation coating located on a surface of the main part.

Preferably, the particles have a spherical shape.

A magnetic member containing a powder according to the present invention can suppress noise in a frequency range of 100 kHz to 20 MHz.

DESCRIPTION OF THE INVENTION

Hereinafter, the present invention will be described in detail based on preferred embodiments with reference to the drawings as necessary.

First Embodiment

Figure 1:
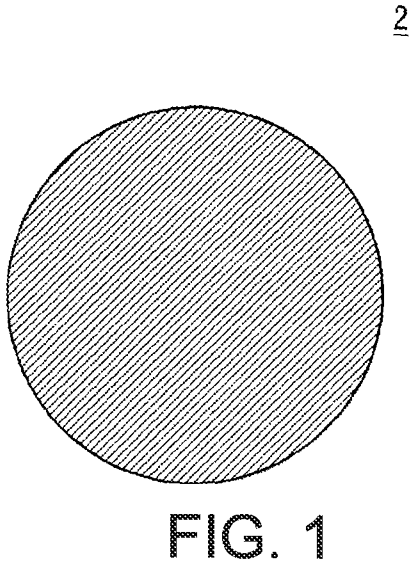
FIG. 1 is a sectional view showing a particle of a powder for a magnetic member according to an embodiment of the present invention.
Figure 2:
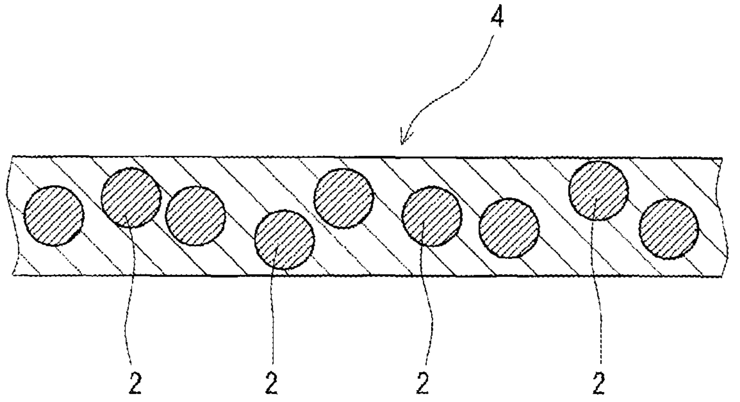
FIG. 2 is a sectional view showing a part of a magnetic sheet in which the powder of FIG. 1 is dispersed.

A powder for a magnetic member according to the present invention is an aggregate of a large number of particles. Each of the particles preferably has a spherical shape. FIG. 1 is a sectional view of the particle 2. FIG. 2 is a sectional view showing a magnetic member (magnetic sheet 4) in which the powder is dispersed.

In order to obtain the magnetic sheet 4, a powder is first kneaded with a base material polymer such as a resin or a rubber, and various agents, to obtain a polymer composition. Known methods may be adopted for kneading. For example, the kneading may be performed in an internal mixer, an open roll and the like. Examples of the agents include processing aids such as a lubricant and a binder.

Next, the magnetic sheet 4 is molded from the polymer composition. Known methods may be adopted for molding. The magnetic sheet 4 may be molded by a compression molding method, an injection molding method, an extrusion molding method, a rolling method and the like.

The shape of the magnetic member is not limited to a sheet shape. A ring shape, a cube shape, a rectangular parallelepiped shape, a cylindrical shape and the like may be adopted. From the viewpoint of easy processing, the processing aids such as a lubricant and a binder may be blended with the composition.

Examples of indexes indicating the performance of the magnetic member include permeability μ, real part permeability μ', and imaginary part permeability μ". The real part permeability μ' indicates the superiority or inferiority of electromagnetic wave shielding properties. The imaginary part permeability indicates the superiority or inferiority of electromagnetic wave absorbing properties. The permeability μ can be calculated from the following expression:

$$\mu=\mu'+j\mu''.$$

In this expression, "j" indicates an imaginary unit. In other words, the square of "j" is −1. In the present application, each of the permeability μ, the real part permeability μ', and the imaginary part permeability μ" is indicated as relative permeability which is a ratio to space permeability. Magnetic loss tan δ in high frequency is indicated as the ratio of the imaginary part permeability μ" to the real part permeability μ'. In other words, the magnetic loss tan δ is calculated according to the following expression:

$$\tan\delta=\mu''/\mu'.$$

As clear from this expression, when eddy current loss, magnetic resonance and the like cause decrease in μ' and increase in μ", the loss tan δ increases.

The saturation magnetic flux density of a magnetic powder composed of a metal is higher than that of ferrite. This is the merit of a metal powder. Meanwhile, in a conventional metal powder, loss caused by magnetic resonance occurs in a lower frequency region than that of the ferrite. Therefore, the metal powder is not suitable for loss reduction in a high frequency region (in a frequency range of 100 kHz to 20 MHz).

The flattening of a powder is useful for securing high permeability. However, the flattened powder has poor kneadability with a polymer.

As a result of further investigation, the present inventors have found that a metal powder having a predetermined composition and structure is suitable for a magnetic member. In the powder according to the present invention, loss can be suppressed in a high frequency region.

A main part of the particle 2 is made of an alloy. Here, the main part is a portion excluding an insulating film when the particle 2 has the insulating film on the surface thereof. The alloy contains B. The content of B in the alloy is 5.0 mass % or more and 8.0 mass % or less. The alloy may further contain one or more elements selected from the group consisting of Cr, Mn, Co, and Ni. The content of the elements is 0 mass % or more and 25 mass % or less. The balance of the alloy is Fe and unavoidable impurities. Hereinafter, the role of each element will be described in full detail.

[Boron (B)]

B is bonded to Fe to produce an intermetallic compound. An alloy in which the intermetallic compound is produced contains an $Fe_2B$ phase. In the magnetic sheet 4 containing the particles made of the alloy, loss in a frequency range of 100 kHz to 20 MHz is small. In the magnetic sheet 4, noise can be suppressed in the frequency range of 100 kHz to 20 MHz. From the viewpoint of the suppression of noise, the content of B is preferably 5.0 mass % or more, and particularly preferably 5.5 mass % or more. An excessive $Fe_2B$ phase causes a reduced saturation magnetic flux density. From the viewpoint of the saturation magnetic flux density, the content of B is preferably 8.0 mass % or less, and particularly preferably 7.5 mass % or less.

[Chromium (Cr)]

Cr is solid-dissolved in Fe to contribute to improvement in a coercive force. The coercive force is correlated with a magnetic resonance frequency. An alloy having a large coercive force has a high magnetic resonance frequency. Cr can further contribute also to the corrosion resistance of the powder. From these viewpoints, the content of Cr is preferably 1.0 mass % or more, and particularly preferably 2.0 mass % or more. The coercive force is negatively correlated with the permeability. The excessive addition of Cr adversely affects improvement in the permeability. From this viewpoint, the content of Cr is preferably 15.0 mass % or less, and particularly preferably 10.0 mass % or less. The content of Cr is measured in accordance with the regulations of "JIS G 1256".

[Manganese (Mn)]

Mn is solid-dissolved in Fe to contribute to improvement in a coercive force. The coercive force is correlated with a magnetic resonance frequency. An alloy having a large coercive force has a high magnetic resonance frequency. From this viewpoint, the content of Mn is preferably 1.0 mass % or more, and particularly preferably 2.0 mass % or more. The coercive force is negatively correlated with the permeability. The excessive addition of Mn adversely affects improvement in the permeability. From this viewpoint, the content of Mn is preferably 5.0 mass % or less. The content of Mn is measured in accordance with the regulations of "JIS G 1256".

[Cobalt (Co)]

Co is solid-dissolved in Fe to contribute to improvement in a coercive force. The coercive force is correlated with a magnetic resonance frequency. An alloy having a large coercive force has a high magnetic resonance frequency. From this viewpoint, the content of Co is preferably 1.0 mass % or more, and particularly preferably 2.0 mass % or more. The coercive force is negatively correlated with the permeability. The excessive addition of Co adversely affects improvement in the permeability. From this viewpoint, the content of Co is preferably 5.0 mass % or less. The content of Co is measured in accordance with the regulations of "JIS G 1256".

[Nickel (Ni)]

Nickel is an austenitizing element. Ni suppresses the formation of a δ ferrite phase. Furthermore, a Ni rich phase in Fe contributes to improvement in the permeability. From this viewpoint, the content of Ni is preferably 1.0 mass % or more, and particularly preferably 2.0 mass % or more. The excessive addition of Ni may inhibit martensitic transformation to adversely affect magnetic property. From this viewpoint, the content of Ni is preferably 5.0 mass % or less. The content of Ni is measured in accordance with the regulations of "JIS G 1256".

When the total content of Cr, Mn, Co, and Ni is excessive, a sufficient $Fe_2B$ phase is not produced, which makes it impossible to suppress noise in a frequency range of 100 kHz to 20 MHz. From this viewpoint, the total content is preferably 25 mass % or less, and particularly preferably 20 mass % or less. The total content of Cr, Mn, Co, and Ni is preferably 3.0 mass % or more, and particularly preferably 5.0 mass % or more. The total content may be zero. In other words, Cr, Mn, Co, and Ni are not indispensable components.

[Balance]

The balance of the alloy is Fe and unavoidable impurities. In the alloy, the inclusion of elements which are the unavoidable impurities is acceptable.

[Area Percentage PS of $Fe_2B$ Phase]

The area percentage of the $Fe_2B$ phase in the alloy (hereinafter referred to as "area percentage PS") is preferably 20% or more and 80% or less. The magnetic sheet 4 which contains the powder made of the alloy in which the area percentage PS is within the above range can suppress noise in a frequency range of 100 kHz to 20 MHz. If the area percentage PS increases, a noise suppressing effect provided by the $Fe_2B$ phase increases. From this viewpoint, the area percentage PS is more preferably 30% or more, and particularly preferably 40% or more. An excessive area percentage PS causes decreased permeability to inhibit noise suppression. From this viewpoint, the area percentage PS is more preferably 70% or less, and particularly preferably 60% or less. In the measurement of the area percentage PS, the cross section of the particle 2 is first observed by SEM, and the $Fe_2B$ phase is specified by energy dispersive X-ray analysis (EDS). Furthermore, the cross section is subjected to image analysis to calculate the area percentage PS. The area percentages of ten particles 2 selected at random are measured, and averaged.

[bHc/N]

A ratio of bHc to weighted average N of the number of electrons possessed by each element (bHc/N) in the alloy is preferably 500 A/(m·electron) or more. The magnetic sheet 4 which contains the powder made of the alloy in which the ratio (bHc/N) is 500 A/(m·electron) or more can suppress noise in a frequency range of 100 kHz to 20 MHz. From this viewpoint, the ratio (bHc/N) is more preferably 530 A/(m·electron) or more, and particularly preferably 550 A/(m·electron) or more. The ratio (bHc/N) is preferably 700 A/(m·electron) or less.

For example, in the case of Fe-3 mass % B, the number of electrons of Fe is 26, and the number of electrons of B is 5, so that weighted average N is calculated by the following expression.

$$5\times0.03+26\times(1-0.03)=25.37$$

For example, in the case of Fe-2 mass % Cr-5 mass % B, the number of electrons of Fe is 26; the number of electrons of Cr is 24; and the number of electrons of B is 5, so that weighted average N is calculated by the following expression.

$$24\times0.02+5\times0.05+26\times(1-0.02-0.05)=24.91$$

By a vibrating sample type magnetometer, bHc is measured. An applied magnetic field during measurement is 120,000 A/m. By analyzing the hysteresis loop of a magnetic body, bHc is derived. An example of the vibrating sample type magnetometer is AGM 2900 manufactured by Lake Shore Cryotronics, Inc.

[Average Particle Diameter]

The average particle diameter D50 of the powder is preferably 20 μm or more and 150 μm or less. The powder having an average particle diameter D50 of 20 μm or more have excellent flowability, and therefore it can be easily mixed with a binder or the like. From this viewpoint, the average particle diameter D50 is more preferably 25 μm or more, and particularly preferably 30 μm or more. A magnetic sheet 4 having a small thickness can be obtained from the powder having an average particle diameter D50 of 150 μm or less. This magnetic sheet 4 can be applied to small electronic devices. From this viewpoint, the average particle diameter D50 is more preferably 120 μm or less, and particularly preferably 100 μm or less.

When the cumulative curve of particles is given where the total volume of the powder is 100%, the average particle diameter D50 is the particle diameter at the point where the cumulative volume in the curve is 50%. The particle diameter is measured by a laser diffraction/scattering type particle size distribution measuring device. A powder together with purified water is poured into the cell in this device, and the average particle diameter is detected based on light scattering information on the particles 2. An example of this device is "Microtrack MT3000" manufactured by Nikkiso Co., Ltd.

The powder can be manufactured by atomization. Preferred examples of the atomization include a gas atomizing method and a water atomizing method.

Second Embodiment

Figure 3:
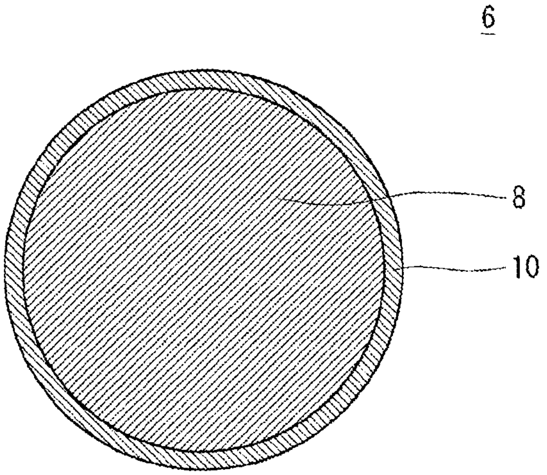
FIG. 3 is a sectional view showing a particle of a powder for a magnetic member according to another embodiment of the present invention.

FIG. 3 is a sectional view showing a particle 6 of a powder for a magnetic member according to another embodiment of the present invention. The particle 6 includes a spherical main part 8 and an insulating film 10. In other words, the particle 6 includes an insulation coating (composed of the insulating film 10) located on the surface of the main part 8. The material, properties, size and the like of the main part 8 are the same as those of the particle 2 shown in FIG. 1. The particle 6 may be obtained by causing the insulating film 10 to adhere to the surface of the particle 2 shown in FIG. 1.

The direct contact of the main part 8 of the particle 6 with the main part 8 of another particle 6 adjacent to the particle 6 is prevented by the insulating film 10. Thereby, eddy current loss is suppressed. From this viewpoint, the thickness of the film 10 is preferably 20 nm or more, and particularly preferably 30 nm or more. From the viewpoint that the magnetic properties of the main part 8 are less likely to be inhibited, the thickness of the film 10 is preferably 500 nm or less, and particularly preferably 100 nm or less.

The ratio (β/α) of a volume resistance value β of a sheet produced from the particle 6 including the insulating film 10 to a volume resistance value α of a sheet produced from the particle including no insulating film 10 is 100 or more.

As shown in FIG. 3, the film 10 covers the whole main part 8. The film 10 may partially cover the main part 8.

The particle 6 may include other film between the main part 8 and the film 10. The particle 6 may include other film on the outside of the film 10.

The film 10 is preferably composed of a polymer containing titanium alkoxides and silicon alkoxides. The polymer may be obtained by the polymerization reaction of a mixture of titanium alkoxides and silicon alkoxides. The titanium alkoxides are compounds in which at least one alkoxide group is bonded to a titanium atom in one molecule. The silicon alkoxides are compounds in which at least one alkoxide group is bonded to a silicon atom in one molecule. The alkoxide group is a compound in which an organic group is bonded to oxygen having a negative electrical charge. The organic group is a group composed of an organic compound.

The titanium alkoxides contain titanium alkoxide monomers, oligomers formed by polymerizing the monomers, and compounds at a stage prior to titanium alkoxide being produced (also referred to as precursor). The silicon alkoxides contain silicon alkoxide monomers, oligomers formed by polymerizing the monomers, and compounds at a stage prior to silicon alkoxide being produced (also referred to as precursor).

Specific examples of the titanium alkoxide include titanium tetramethoxide, titanium tetraethoxide, titanium tetraisopropoxide, titanium tetrabutoxide, titanium tetra-2-ethylhexoxide, and isopropyl tridodecylbenzenesulfonyl titanate.

Specific examples of the silicon alkoxide include tetraethoxysilane, tetramethoxysilane, methyltriethoxysilane, tetraisopropoxysilane, vinyltrimetoxysilane, γ-aminopropyl triethoxysilane, and N-(β-aminoethyl)-γ-aminopropyl methyl dimethoxysilane.

Various coating methods may be adopted for the adhesion of the film 10 to the main part 8. Specific examples of the coating method include a mixing method, a sol-gel method, a spray drier method, and a tumbling fluidized bed coating method.

The polymer containing titanium alkoxides and silicon alkoxides may be diluted with a solvent, the diluted solution being provided to coating. Preferred examples of the solvent include acetone, methyl ethyl ketone, acetonitrile, methanol, ethanol, isopropyl alcohol, n-butanol, benzene, toluene, hexane, heptane, cyclohexane, chloroform, chlorobenzene, dichlorobenzene, ethyl acetate, ethyl propionate, and tetrahydrofuran.

The film 10 may contain other compounds together with the polymer containing titanium alkoxides and silicon alkoxides. The film 10 may be formed of a compound other than the polymer containing titanium alkoxides and silicon alkoxides.

EXAMPLES

Hereinafter, the effects of the present invention are clarified by Examples, but the present invention should not be construed as being limited to these Examples.

Example 1

A powder of Example 1 having a composition shown in the following Table 1 was produced by atomization. The shape of each particle in the powder was a sphere. The powder was kneaded with an epoxy resin at a temperature of 100° C. using a small mixer, to obtain a resin composition in which the powder was uniformly dispersed in a resin matrix. The ratio of the volume of the epoxy resin to that of the powder was set to 5:2. The resin composition was subjected to a hot press treatment for 5 minutes under conditions of a pressure of 4 MPa and a temperature of 200° C. to obtain a magnetic sheet having a thickness of 0.1 mm.

Examples 2 to 30 and Comparative Examples 1 to 16

Powders of Examples 2 to 30 and Comparative Examples 1 to 16 were produced in the same manner as in Example 1 except that compositions were set as shown in the following Tables 1 to 3. Magnetic sheets were obtained from these powders in the same manner as in Example 1.

[Evaluation of Magnetic Sheets]

A frequency was fluctuated under conditions of a temperature of 25° C. to measure the permeability and tan δ of each of the magnetic sheets. The measurement was performed by "Vector Network Analyzer N5245A" (trade name) manufactured by Agilent Technologies. Real part permeability μ' at 10 MHz and a lower limit FL of a frequency region in which tan δ was more than 0.02 were obtained. Furthermore, based on the real part permeability μ' and the lower limit FL, each powder was ranked in accordance with the following criteria:

A: μ' is 4.0 or more, and FL is 100 MHz or more;

B: μ' is 4.0 or more, and FL is more than 40 MHz and less than 100 MHz;

C: μ' is 4.0 or more, and FL is 10 MHz or more and 40 MHz or less; and

F: μ' is less than 4.0, or FL is less than 10 MHz.

These results are shown in the following Tables 1 to 3.

TABLE 1

| Evaluation Results | | | | | | | | | | | | |
|---|---|---|---|---|---|---|---|---|---|---|---|---|
| | B | Cr | Mn | Co | Ni | Cr + Mn + Co + Ni | Fe | PS (%) $Fe_2B$ | bHc/N | Permeability μ' | Frequency FL (MHz) | Rating |
| Ex. 1 | 7.4 | 0.0 | 0.0 | 0.0 | 0.0 | 0.0 | Bal. | 7 | 364 | 5 | 39 | C |
| Ex. 2 | 6.2 | 13.1 | 4.6 | 0.0 | 2.3 | 20.0 | Bal. | 9 | 403 | 4.5 | 14 | C |
| Ex. 3 | 5.5 | 5.6 | 0.0 | 1.6 | 0.8 | 8.0 | Bal. | 5 | 452 | 5.2 | 36 | C |
| Ex. 4 | 7.0 | 0.0 | 0.0 | 0.0 | 0.0 | 0.0 | Bal. | 9 | 388 | 4.7 | 22 | C |
| Ex. 5 | 6.2 | 13.8 | 2.3 | 2.3 | 4.6 | 23.0 | Bal. | 13 | 411 | 5 | 27 | C |
| Ex. 6 | 7.1 | 1.0 | 0.4 | 0.2 | 0.4 | 2.0 | Bal. | 87 | 408 | 4.5 | 13 | C |
| Ex. 7 | 6.1 | 3.0 | 0.0 | 1.0 | 1.0 | 5.0 | Bal. | 88 | 405 | 4.6 | 40 | C |
| Ex. 8 | 7.0 | 4.8 | 0.6 | 0.0 | 0.6 | 6.0 | Bal. | 87 | 393 | 4.6 | 23 | C |
| Ex. 9 | 6.4 | 12.8 | 0.0 | 3.2 | 0.0 | 16.0 | Bal. | 89 | 380 | 5.2 | 18 | C |
| Ex. 10 | 7.2 | 14.6 | 4.4 | 0.0 | 0.0 | 19.0 | Bal. | 85 | 415 | 5.1 | 35 | C |
| Ex. 11 | 7.0 | 10.0 | 2.0 | 4.0 | 4.0 | 20.0 | Bal. | 59 | 439 | 4.9 | 50 | B |
| Ex. 12 | 6.1 | 14.1 | 2.3 | 4.6 | 0.0 | 21.0 | Bal. | 40 | 413 | 4.6 | 73 | B |
| Ex. 13 | 6.6 | 13.4 | 3.2 | 3.2 | 3.2 | 23.0 | Bal. | 32 | 407 | 4.6 | 71 | B |
| Ex. 14 | 5.9 | 6.3 | 0.0 | 1.8 | 0.9 | 9.0 | Bal. | 44 | 424 | 4.9 | 63 | B |
| Ex. 15 | 6.5 | 12.0 | 0.0 | 4.0 | 4.0 | 20.0 | Bal. | 54 | 447 | 4.6 | 78 | B |
| Ex. 16 | 5.9 | 7.0 | 0.0 | 1.0 | 2.0 | 10.0 | Bal. | 42 | 424 | 4.7 | 61 | B |
| Ex. 17 | 6.0 | 3.0 | 0.0 | 0.0 | 0.0 | 3.0 | Bal. | 36 | 369 | 5.4 | 84 | B |
| Ex. 18 | 7.5 | 5.0 | 2.0 | 1.0 | 2.0 | 10.0 | Bal. | 54 | 426 | 5.3 | 73 | B |

TABLE 1-continued

| | Evaluation Results | | | | | | | | | | | |
|---|---|---|---|---|---|---|---|---|---|---|---|---|
| | B | Cr | Mn | Co | Ni | Cr + Mn + Co + Ni | Fe | PS (%) $Fe_2B$ | bHc/N | Permeability μ' | Frequency FL (MHz) | Rating |
| Ex. 19 | 7.3 | 9.9 | 1.1 | 0.0 | 0.0 | 11.0 | Bal. | 61 | 382 | 4.5 | 67 | B |
| Ex. 20 | 6.9 | 8.5 | 3.4 | 3.4 | 1.7 | 17.0 | Bal. | 32 | 400 | 5 | 75 | B |

(Composition: mass %)

TABLE 2

| | Evaluation Results | | | | | | | | | | | |
|---|---|---|---|---|---|---|---|---|---|---|---|---|
| | B | Cr | Mn | Co | Ni | Cr + Mn + Co + Ni | Fe | PS (%) $Fe_2B$ | bHc/N | Permeability μ' | Frequency FL (MHz) | Rating |
| Ex. 21 | 6.9 | 14.0 | 2.0 | 4.0 | 0.0 | 20.0 | Bal. | 42 | 665 | 4.7 | 133 | A |
| Ex. 22 | 6.2 | 12.0 | 0.0 | 0.0 | 3.0 | 15.0 | Bal. | 57 | 594 | 5.3 | 146 | A |
| Ex. 23 | 6.0 | 13.0 | 0.0 | 0.0 | 0.0 | 13.0 | Bal. | 33 | 563 | 5.1 | 112 | A |
| Ex. 24 | 7.0 | 12.1 | 4.6 | 0.0 | 2.3 | 19.0 | Bal. | 30 | 615 | 4.7 | 145 | A |
| Ex. 25 | 7.1 | 0.0 | 0.0 | 0.0 | 0.0 | 0.0 | Bal. | 57 | 555 | 5.5 | 127 | A |
| Ex. 26 | 6.8 | 9.6 | 1.2 | 0.0 | 1.2 | 12.0 | Bal. | 33 | 531 | 4.6 | 147 | A |
| Ex. 27 | 7.4 | 4.2 | 1.4 | 0.0 | 1.4 | 7.0 | Bal. | 49 | 554 | 5.2 | 120 | A |
| Ex. 28 | 7.2 | 0.9 | 0.0 | 0.0 | 0.1 | 1.0 | Bal. | 48 | 552 | 5.4 | 106 | A |
| Ex. 29 | 6.9 | 4.2 | 1.4 | 1.4 | 0.0 | 7.0 | Bal. | 66 | 555 | 5.3 | 110 | A |
| Ex. 30 | 6.8 | 3.2 | 0.8 | 0.0 | 0.0 | 4.0 | Bal. | 54 | 673 | 5.5 | 115 | A |
| Comp Ex. 1 | 1.6 | 5.6 | 0.8 | 0.0 | 1.6 | 8.0 | Bal. | 1 | 122 | 3.3 | 3 | F |
| Comp Ex. 2 | 3.9 | 10.0 | 4.0 | 2.0 | 4.0 | 20.0 | Bal. | 4 | 86 | 3.4 | 8 | F |
| Comp Ex. 3 | 4.4 | 2.4 | 0.8 | 0.0 | 0.8 | 4.0 | Bal. | 2 | 83 | 2.5 | 9 | F |
| Comp Ex. 4 | 3.8 | 8.4 | 0.0 | 2.4 | 1.2 | 12.0 | Bal. | 3 | 300 | 2.5 | 5 | F |
| Comp Ex. 5 | 2.9 | 12.8 | 1.6 | 1.6 | 0.0 | 16.0 | Bal. | 0 | 223 | 2.9 | 7 | F |
| Comp Ex. 6 | 5.9 | 16.0 | 6.4 | 3.2 | 6.4 | 32.0 | Bal. | 67 | 268 | 3.1 | 8 | F |
| Comp Ex. 7 | 5.7 | 20.3 | 2.9 | 0.0 | 5.8 | 29.0 | Bal. | 39 | 307 | 2.7 | 9 | F |
| Comp Ex. 8 | 7.4 | 20.4 | 0.0 | 6.8 | 6.8 | 34.0 | Bal. | 72 | 311 | 2.5 | 10 | F |
| Comp Ex. 9 | 6.7 | 15.5 | 3.1 | 6.2 | 6.2 | 31.0 | Bal. | 55 | 108 | 2.7 | 5 | F |
| Comp Ex. 10 | 6.0 | 24.3 | 0.0 | 0.0 | 2.7 | 27.0 | Bal. | 59 | 135 | 2.9 | 10 | F |

(Composition: mass %)

TABLE 3

| | Evaluation Results | | | | | | | | | | | |
|---|---|---|---|---|---|---|---|---|---|---|---|---|
| | B | Cr | Mn | Co | Ni | Cr + Mn + Co + Ni | Fe | PS (%) $Fe_2B$ | bHc/N | Permeability μ' | Frequency FL (MHz) | Rating |
| Comp Ex. 11 | 9.5 | 1.8 | 0.0 | 0.0 | 0.2 | 2.0 | Bal. | 90 | 30 | 3.4 | 123 | F |
| Comp Ex. 12 | 0.0 | 2.4 | 0.0 | 0.8 | 0.8 | 4.0 | Bal. | 0 | 3 | 3.4 | 1 | F |
| Comp Ex. 13 | 0.0 | 8.4 | 0.0 | 2.4 | 1.2 | 12.0 | Bal. | 0 | 7 | 3 | 0.6 | F |
| Comp Ex. 14 | 0.0 | 0.6 | 0.2 | 0.1 | 0.1 | 1.0 | Bal. | 0 | 3 | 3.3 | 0.4 | F |
| Comp Ex. 15 | 0.0 | 2.8 | 0.4 | 0.4 | 0.4 | 4.0 | Bal. | 0 | 4 | 3.2 | 1 | F |
| Comp Ex. 16 | 0.0 | 0.0 | 0.0 | 0.0 | 0.0 | 0.0 | Bal. | 0 | 7 | 2.8 | 1.4 | F |

(Composition: mass %)

The superiority of the present invention is apparent from the evaluation results shown in Tables 1 to 3.

The powder according to the present invention is suitable for various magnetic members.

The invention claimed is:

1. A powder for a magnetic member composed of a plurality of particles, wherein a main part of each of the particles is made of an alloy composed of:

5.0 mass % or more and 8.0 mass % or less of B, and the balance being Fe and unavoidable impurities, wherein the alloy contains an $Fe_2B$ phase, and a ratio of bHc to weighted average N of a number of electrons possessed by each element (bHc/N) in the alloy is 500 A/(m·electron) or more and 700 A/(m·electron) or less.

2. A powder for a magnetic member composed of a plurality of particles, wherein a main part of each of the particles is made of an alloy composed of:

5.0 mass % or more and 8.0 mass % or less of B, 0 mass % or more and 25 mass % or less of one or more selected from the group consisting of Cr, Mn, Co, and Ni, and the balance being Fe and unavoidable impurities, wherein the alloy contains an $Fe_2B$ phase, and a ratio of bHc to weighted average N of a number of electrons possessed by each element (bHc/N) in the alloy is 500 A/(m·electron) or more and 700 A/(m·electron) or less.

3. The powder for a magnetic member according to claim 1, wherein an area percentage PS of the $Fe_2B$ phase in the alloy is 20% or more and 80% or less.

4. The powder for a magnetic member according to claim 1, wherein the particles include an insulation coating located on a surface of the main part.

5. The powder for a magnetic member according to claim 1, wherein the particles have a spherical shape.

6. The powder for a magnetic member according to claim 2, wherein an area percentage PS of the $Fe_2B$ phase in the alloy is 20% or more and 80% or less.

7. The powder for a magnetic member according to claim 2, wherein the particles include an insulation coating located on a surface of the main part.

8. The powder for a magnetic member according to claim 2, wherein the particles have a spherical shape.

9. The powder for a magnetic member according to claim 3, wherein the particles include an insulation coating located on a surface of the main part.

10. The powder for a magnetic member according to claim 3, wherein the particles have a spherical shape.

11. The powder for a magnetic member according to claim 4, wherein the particles have a spherical shape.

12. The powder for a magnetic member according to claim 6, wherein the particles have a spherical shape.

* * * * *